(12) United States Patent
Wang et al.

(10) Patent No.: US 12,562,758 B2
(45) Date of Patent: Feb. 24, 2026

(54) BLUETOOTH CHIP, SIGNAL RECEIVING METHOD, AND BLUETOOTH COMMUNICATIONS APPARATUS

(71) Applicant: Huawei Technologies Co., Ltd., Guangdong (CN)

(72) Inventors: Qinghui Wang, Shanghai (CN); Wei Ruan, Shanghai (CN); Xuqiang Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/191,309

(22) Filed: Mar. 28, 2023

(65) Prior Publication Data

US 2023/0231581 A1 Jul. 20, 2023

Related U.S. Application Data

(63) Continuation of application No. PCT/CN2020/119022, filed on Sep. 29, 2020.

(51) Int. Cl.
*H04B 1/38* (2015.01)
*H04B 1/00* (2006.01)
(Continued)

(52) U.S. Cl.
CPC ............. *H04B 1/0064* (2013.01); *H04B 1/38* (2013.01)

(58) Field of Classification Search
CPC .......... H04B 1/0064; H04B 1/38; H04B 5/48; H04W 84/18; H04W 76/15; H04W 4/80
See application file for complete search history.

(56) References Cited

U.S. PATENT DOCUMENTS 7,636,560 B2 * 12/2009 Ku ............................ H04B 7/00
455/272
8,867,504 B2 * 10/2014 Tugcu et al. ......... H04W 92/16
370/338

(Continued)

FOREIGN PATENT DOCUMENTS

| CN | 110069788 A | 7/2019 |
|---|---|---|
| EP | 3261369 A1 | 12/2017 |
| WO | 2020117409 A2 | 6/2020 |

OTHER PUBLICATIONS

Andrea Goldsmith: "Wireless Communications-Chapter 7 "Diversity"" In: "Wireless communications", Cambridge Univ. Press, Cambridge, Aug. 8, 2005, total 24 pages.

*Primary Examiner* — Curtis A Kuntz
(74) *Attorney, Agent, or Firm* — WOMBLE BOND DICKINSON (US) LLP

(57) ABSTRACT

This application discloses a wireless chip, a signal receiving method, and a wireless communications apparatus, and relates to the wireless communications field, to improve a signal strength of a received signal obstructed by an object, and select a wireless radio frequency channel corresponding to an antenna with good directivity. The wireless chip includes: a first wireless radio frequency channel, coupled to a first antenna; a second wireless radio frequency channel, coupled to a second antenna; and a wireless baseband, coupled to each of the first wireless radio frequency channel and the second wireless radio frequency channel, and configured to selectively receive a signal transmitted by a transmitting device, through at least one of the first wireless radio frequency channel or the second wireless radio frequency channel. The wireless chip can be a Bluetooth chip.

9 Claims, 8 Drawing Sheets

(51) Int. Cl.
    H04W 4/80        (2018.01)
    H04W 76/15      (2018.01)

(56) References Cited

U.S. PATENT DOCUMENTS

| | | | | |
|---|---|---|---|---|
| 9,258,151 B2 * | 2/2016 | Hou | .................... | H04L 25/03 |
| 10,129,165 B2 * | 11/2018 | Di Nallo et al. | ..... | H04L 47/564 |
| 10,687,191 B1 * | 6/2020 | Chen | .................... | H04W 4/80 |
| 12,015,452 B2 * | 6/2024 | Marshall | .............. | H04B 17/309 |
| 2005/0053039 A1 * | 3/2005 | Dewan et al. | .......... | H04Q 7/00 |
| | | | | 370/334 |
| 2006/0073802 A1 * | 4/2006 | Chari et al. | .............. | H04B 1/06 |
| | | | | 455/276.1 |
| 2008/0242229 A1 | 10/2008 | Sharma | | |
| 2015/0242665 A1 | 8/2015 | Antonescu et al. | | |
| 2016/0094921 A1 * | 3/2016 | Chen | | |
| 2020/0053832 A1 | 2/2020 | Yang | | |

* cited by examiner

Selectively receive, through at least one of a first Bluetooth radio frequency channel or a second Bluetooth radio frequency channel, a signal transmitted by a transmitting device

S801

92

92

91

BLUETOOTH CHIP, SIGNAL RECEIVING METHOD, AND BLUETOOTH COMMUNICATIONS APPARATUS

CROSS-REFERENCE TO RELATED APPLICATIONS

This application is a continuation of International Application No. PCT/CN2020/119022, filed on Sep. 29, 2020, the disclosure of which is hereby incorporated by reference in its entirety.

TECHNICAL FIELD

This application relates to the Bluetooth communications field, and in particular, to a Bluetooth chip, a signal receiving method, and a Bluetooth communications apparatus.

BACKGROUND

To reduce impact of directivity of an antenna of a Bluetooth communications apparatus on receiving performance, a plurality of Bluetooth antennas are usually installed in the Bluetooth communications apparatus, and the plurality of Bluetooth antennas perform Bluetooth communication through respective independent Bluetooth radio frequency (RF) channels. However, a plurality of Bluetooth antennas bring some new problems. On one hand, obstruction by an object reduces signal strengths of Bluetooth signals received by all antennas, and a better Bluetooth radio frequency channel cannot be selected from the plurality of radio frequency channels. On the other hand, two devices in communication may move relative to each other. Due to directionality of the antenna, a signal received through a single Bluetooth radio frequency channel is not necessarily the best.

SUMMARY

Embodiments of this application provide a Bluetooth chip, a signal receiving method, and a Bluetooth communications apparatus, to improve a signal strength of a received signal obstructed by an object, and select a Bluetooth radio frequency channel corresponding to an antenna with good directivity.

To achieve the foregoing objective, the following technical solutions are used in embodiments of this application.

According to a first aspect, a Bluetooth chip is provided, including: a first Bluetooth radio frequency channel, coupled to a first antenna: a second Bluetooth radio frequency channel, coupled to a second antenna; and a Bluetooth baseband, coupled to each of the first Bluetooth radio frequency channel and the second Bluetooth radio frequency channel, and configured to selectively receive a signal transmitted by a transmitting device, through at least one of the first Bluetooth radio frequency channel or the second Bluetooth radio frequency channel.

The Bluetooth chip provided in this embodiment of this application includes: the first Bluetooth radio frequency channel coupled to the first antenna: the second Bluetooth radio frequency channel coupled to the second antenna; and a combination processing module coupled to each of the first Bluetooth radio frequency channel and the second Bluetooth radio frequency channel, and configured to selectively receive the signal transmitted by the transmitting device, through at least one of the first Bluetooth radio frequency channel or the second Bluetooth radio frequency channel.

On one hand, when one Bluetooth radio frequency channel is selected to receive a signal, a Bluetooth radio frequency channel corresponding to an antenna with good directivity may be selected. On the other hand, when two Bluetooth radio frequency channels are selected to receive signals, these signals may be combined, so that sensitivity can be improved, thereby improving a signal strength of a received signal obstructed by an object.

In an embodiment, the combination processing module is specifically configured to receive the signal transmitted by the transmitting device, through at least one of the first Bluetooth radio frequency channel or the second Bluetooth radio frequency channel, and based on signal quality of signals received through the first Bluetooth radio frequency channel and the second Bluetooth radio frequency channel. That is, how to receive a signal is determined based on signal quality of each Bluetooth radio frequency channel.

In an embodiment, the combination processing module is specifically configured to select one of the first Bluetooth radio frequency channel or the second Bluetooth radio frequency channel based on the signal quality of signals received through the first Bluetooth radio frequency channel and the second Bluetooth radio frequency channel, to receive the signal transmitted by the transmitting device. That is, one Bluetooth radio frequency channel with better signal quality is selected to receive the signal transmitted by the transmitting device.

In an embodiment, the combination processing module is specifically configured to: receive, through the first Bluetooth radio frequency channel and the second Bluetooth radio frequency channel, the signal transmitted by the transmitting device; and combine the signals received through the first Bluetooth radio frequency channel and the second Bluetooth radio frequency channel, based on the signal quality of the signals received through the first Bluetooth radio frequency channel and the second Bluetooth radio frequency channel. That is, the signal transmitted by the transmitting device is received through the two Bluetooth radio frequency channels, and then the signals received through the two Bluetooth radio frequency channels are combined based on the signal quality of the two Bluetooth radio frequency channels.

In an embodiment, the combination processing module is further configured to: obtain a time delay and a phase difference between the first Bluetooth radio frequency channel and the second Bluetooth radio frequency channel: perform, based on the time delay, time alignment on the signals received through the first Bluetooth radio frequency channel and the second Bluetooth radio frequency channel; and perform, based on the phase difference, phase alignment on the signals received through the first Bluetooth radio frequency channel and the second Bluetooth radio frequency channel. In this way, signals of different Bluetooth radio frequency channels are in-phase superposed at the same time, to obtain a maximum gain.

In an embodiment, the combination processing module is specifically configured to: determine a weight of the first Bluetooth radio frequency channel and a weight of the second Bluetooth radio frequency channel based on the signal quality, where a Bluetooth radio frequency channel with better signal quality has a larger weight; and combine, according to the formula $$SNR = \frac{\left(\sum_{i=1}^{N}\left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, where $w_i$ represents a weight of the $i^{th}$ Bluetooth radio frequency channel, $S_i$ represents signal energy received through the $i^{th}$ Bluetooth radio frequency channel, $N_0$ represents noise intensity, and N represents a quantity of Bluetooth radio frequency channels. According to the formula, weighting is also performed on noise, and a weight is used as a denominator to reduce impact of the noise.

According to a second aspect, a signal receiving method is provided, applied to the Bluetooth chip according to the first aspect and any embodiment of the first aspect. The method includes: selectively receiving a signal transmitted by a transmitting device, through at least one of a first Bluetooth radio frequency channel or a second Bluetooth radio frequency channel of the Bluetooth chip.

In an embodiment, the selectively receiving a signal transmitted by a transmitting device, through at least one of a first Bluetooth radio frequency channel or a second Bluetooth radio frequency channel of the Bluetooth chip includes: selectively receiving the signal transmitted by the transmitting device, through at least one of the first Bluetooth radio frequency channel or the second Bluetooth radio frequency channel, and based on signal quality of signals received through the first Bluetooth radio frequency channel and the second Bluetooth radio frequency channel.

In an embodiment, the selectively receiving the signal transmitted by the transmitting device, through the at least one of the first Bluetooth radio frequency channel or the second Bluetooth radio frequency channel, and based on signal quality of signals received through the first Bluetooth radio frequency channel and the second Bluetooth radio frequency channel includes: selecting one of the first Bluetooth radio frequency channel or the second Bluetooth radio frequency channel based on the signal quality of the signals received through the first Bluetooth radio frequency channel and the second Bluetooth radio frequency channel, to receive the signal transmitted by the transmitting device.

In an embodiment, the selectively receiving the signal transmitted by the transmitting device, through the at least one of the first Bluetooth radio frequency channel or the second Bluetooth radio frequency channel, and based on signal quality of signals received through the first Bluetooth radio frequency channel and the second Bluetooth radio frequency channel includes: receiving, through the first Bluetooth radio frequency channel and the second Bluetooth radio frequency channel, the signal transmitted by the transmitting device; and combining the signals received through the first Bluetooth radio frequency channel and the second Bluetooth radio frequency channel, based on the signal quality of the signals received through the first Bluetooth radio frequency channel and the second Bluetooth radio frequency channel.

In an embodiment, the method further includes: obtaining a time delay and a phase difference between the first Bluetooth radio frequency channel and the second Bluetooth radio frequency channel: performing, based on the time delay, time alignment on the signals received through the first Bluetooth radio frequency channel and the second Bluetooth radio frequency channel; and performing, based on the phase difference, phase alignment on the signals received through the first Bluetooth radio frequency channel and the second Bluetooth radio frequency channel.

In an embodiment, the combining the signals received through the first Bluetooth radio frequency channel and the second Bluetooth radio frequency channel, based on the signal quality of the signals received through the first Bluetooth radio frequency channel and the second Bluetooth radio frequency channel includes: determining a weight of the first Bluetooth radio frequency channel and a weight of the second Bluetooth radio frequency channel based on the signal quality, where a Bluetooth radio frequency channel with better signal quality has a larger weight; and combining, according to the formula $$SNR = \frac{\left(\sum_{i=1}^{N}\left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, where $w_i$ represents a weight of an $i^{th}$ Bluetooth radio frequency channel, $S_i$ represents signal energy of a radio frequency on the $i^{th}$ Bluetooth radio frequency channel, $N_0$ represents noise intensity, and N represents a quantity of Bluetooth radio frequency channels.

According to a third aspect, a Bluetooth communications apparatus is provided, including a Bluetooth chip, a first antenna, a second antenna, and an application processor, where the Bluetooth chip is coupled to the application processor. The Bluetooth chip includes: a first Bluetooth radio frequency channel coupled to the first antenna: a second Bluetooth radio frequency channel coupled to the second antenna; and a combination processing module, coupled to each of the first Bluetooth radio frequency channel and the second Bluetooth radio frequency channel, and configured to selectively receive a signal transmitted by a transmitting device, through at least one of the first Bluetooth radio frequency channel or the second Bluetooth radio frequency channel. The Bluetooth chip is further configured to demodulate the received signal, and send a demodulated signal to the application processor.

In an embodiment, the combination processing module is specifically configured to receive the signal transmitted by the transmitting device, through at least one of the first Bluetooth radio frequency channel or the second Bluetooth radio frequency channel, and based on signal quality of signals received through the first Bluetooth radio frequency channel and the second Bluetooth radio frequency channel.

In an embodiment, the combination processing module is specifically configured to select one of the first Bluetooth radio frequency channel or the second Bluetooth radio frequency channel based on the signal quality of the signals received through the first Bluetooth radio frequency channel and the second Bluetooth radio frequency channel, to receive the signal transmitted by the transmitting device.

In an embodiment, the combination processing module is specifically configured to: receive, through the first Bluetooth radio frequency channel and the second Bluetooth radio frequency channel, the signal transmitted by the transmitting device; and combine the signals received through the first Bluetooth radio frequency channel and the second Bluetooth radio frequency channel, based on the signal quality of the signals received through the first Bluetooth radio frequency channel and the second Bluetooth radio frequency channel.

In an embodiment, the combination processing module is further configured to: obtain a time delay and a phase difference between the first Bluetooth radio frequency channel and the second Bluetooth radio frequency channel: perform, based on the time delay, time alignment on the signals received through the first Bluetooth radio frequency channel and the second Bluetooth radio frequency channel; and perform, based on the phase difference, phase alignment on the signals received through the first Bluetooth radio frequency channel and the second Bluetooth radio frequency channel.

In an embodiment, the combination processing module is specifically configured to: determine a weight of the first Bluetooth radio frequency channel and a weight of the second Bluetooth radio frequency channel based on the signal quality, where a Bluetooth radio frequency channel with better signal quality has a larger weight; and combine, according to the formula $$SNR = \frac{\left(\sum_{i=1}^{N}\left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, where $w_i$ represents a weight of an $i^{th}$ Bluetooth radio frequency channel, $S_i$ represents signal energy received through the $i^{th}$ Bluetooth radio frequency channel, $N_0$ represents noise intensity, and $N$ represents a quantity of Bluetooth radio frequency channels.

According to a fourth aspect, a computer-readable storage medium is provided. The computer-readable storage medium stores a computer program, and when the computer program is run on a computer or a processor, the computer or the processor is enabled to perform the method according to the second aspect and any one of the embodiments of the second aspect.

According to a fifth aspect, a computer program product including instructions is provided. When the instructions are run on a computer or a processor, the computer or the processor is enabled to perform the method according to the second aspect and any one of the embodiments of the second aspect.

For technical effects of the second aspect to the fifth aspect, refer to technical effects of the first aspect and any one of the embodiments of the first aspect.

6

Figures 8, 9:
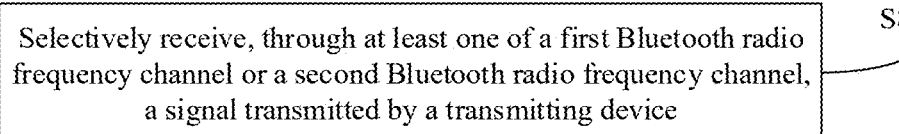

FIG. 8 is a schematic flowchart of a signal receiving method according to an embodiment of this application; and FIG. 9 is a schematic diagram of a change of a relative location between a Bluetooth communications apparatus and a transmitting device according to an embodiment of this application.

DESCRIPTION OF EMBODIMENTS

A Bluetooth communications apparatus in embodiments of this application may be a device including a Bluetooth transceiver function. Specifically, the Bluetooth communications apparatus may be user equipment (UE), an access terminal, a subscriber unit, a subscriber station, a mobile station, a mobile console, a remote station, a remote terminal, a mobile device, a user terminal, a terminal, a wireless communications apparatus, a user agent, or a user apparatus. For example, the Bluetooth communications apparatus may be a mobile phone, a Bluetooth headset, a smart television, a smart speaker, a smartwatch, a handheld device, a computing device, a robot, an unmanned aerial vehicle, a smart driving vehicle, a smart home, an in-vehicle device, a medical device, a smart logistics device, a wearable device, a Bluetooth communications apparatus in a 5th generation (5G) communications network, or a communications network after 5G. This is not limited in embodiments of this application.

Figure 1:
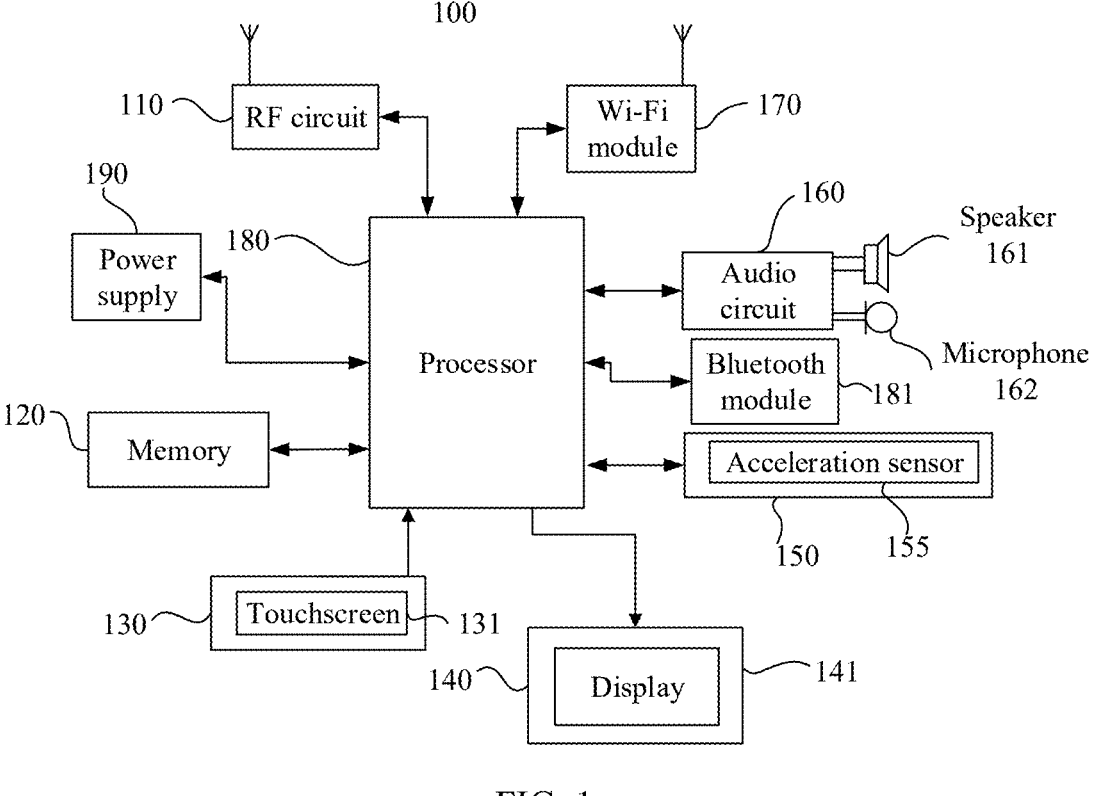
FIG. 1 is a schematic diagram of a structure of a Bluetooth communications apparatus according to an embodiment of this application.

As shown in FIG. 1, a structure of a Bluetooth communications apparatus is described by using an example in which the Bluetooth communications apparatus is a mobile phone.

The Bluetooth communications apparatus 100 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 110 may be configured to receive and send a signal during information receiving and sending or during a call. The RF circuit 110 may receive downlink data from a base station and then deliver the downlink data to the processor 180 for processing, and may send uplink data to the base station. Usually, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to perform various functions of the Bluetooth communications apparatus 100 and data processing. The memory 120 may include a high-speed random-access memory, and may further include a nonvolatile memory, for example, at least one magnetic disk storage device, a flash memory, or another volatile solid-state storage device. The memory 120 stores an operating system that enables the Bluetooth communications apparatus 100 to run, for example, the iOS® operating system developed by Apple, the Android® open-source operating system developed by Google, or the Windows R operating system developed by Microsoft. The memory 120 in this application may store the operating system and various application programs, and may further store code for performing the method in embodiments of this application.

The input unit 130 (for example, a touchscreen) may be configured to receive input digit or character information, and generate a signal input related to a user setting and function control of the Bluetooth communications apparatus 100.

Specifically, the input unit 130 may include a touchscreen 131 disposed on a front side of the Bluetooth communications apparatus 100, and may collect a touch operation of a user on or near the touchscreen 131.

The display unit 140 (that is, a display) may be configured to display information entered by the user or information provided for the user, and a graphical user interface (GUI) of various menus of the Bluetooth communications apparatus 100. The display unit 140 may include a display 141 disposed on the front side of the Bluetooth communications apparatus 100. The display 141 may be configured in a form of a liquid crystal display, a light-emitting diode, or the like. The display unit 140 may be configured to display various graphical user interfaces in this application. The touchscreen 131 may cover the display. Alternatively, the touchscreen 131 and the display 141 may be integrated to implement input and output functions of the Bluetooth communications apparatus 100, and may be referred to as a touch display for short after the integration.

The Bluetooth communications apparatus 100 may further include at least one sensor 150, such as an acceleration sensor 155, an optical sensor, or a motion sensor. The Bluetooth communications apparatus 100 may be further configured with other sensors such as a gyroscope, a barometer, a hygrometer, a thermometer, and an infrared sensor.

Wi-Fi belongs to a short-range wireless transmission technology. The Bluetooth communications apparatus 100 may help, through the Wi-Fi module 170, the user receive and send an email, browse a web page, access streaming media, and the like. The Wi-Fi provides wireless broadband Internet access for the user.

The processor 180 is a control center of the Bluetooth communications apparatus 100, and connects all parts of an entire terminal by using various interfaces and lines. By running or executing a software program stored in the memory 120 and invoking data stored in the memory 120, the processor 180 performs various functions of the Bluetooth communications apparatus 100 and processes data. In this application, the processor 180 may be one or more processors, and the processor 180 may include one or more processing units. The processor 180 may further integrate an application processor and a baseband processor, where the application processor mainly processes an operating system, a user interface, an application program, and the like, and the baseband processor mainly processes wireless communication. It may be understood that the baseband processor may alternatively not be integrated into the processor 180. The processor 180 in this application may run the operating system and the application program, display a user interface, respond to a touch, and perform the communications method in embodiments of this application.

The Bluetooth communications apparatus 100 further includes the power supply 190 (such as a battery) that supplies power to each component. The power supply may be logically connected to the processor 180 through a power management system, to execute functions such as charging and discharging management and power consumption management through the power management system.

The audio circuit 160, a speaker 161, and a microphone 162 may provide an audio interface between the user and the Bluetooth communications apparatus 100. The audio circuit 160 may transmit an electrical signal obtained after converting received audio data to the speaker 161. The speaker 161 converts the electrical signal into a sound signal for output.

On the other hand, the microphone 162 converts a collected sound signal into an electrical signal. The audio circuit 160 receives the electrical signal, converts the electrical signal into audio data, and outputs the audio data to the RF circuit 110, to send the audio data to another terminal or the like, or outputs the audio data to the memory 120 for further processing.

The Bluetooth module 181 is configured to exchange information, through a Bluetooth protocol, with another Bluetooth device having a Bluetooth module. For example, the Bluetooth communications apparatus 100 may establish, through the Bluetooth module 181, a Bluetooth connection to a wearable electronic device (for example, a smartwatch) that also has a Bluetooth module, so as to exchange data. The Bluetooth module 181 includes at least one antenna and a Bluetooth chip that are coupled.

The following uses dual antennas as an example to describe several possible structures of a Bluetooth chip supporting a plurality of antennas.

In an embodiment, one Bluetooth radio frequency channel is switched between the dual antennas to implement time division multiplexing of the dual antennas.

Figure 2:
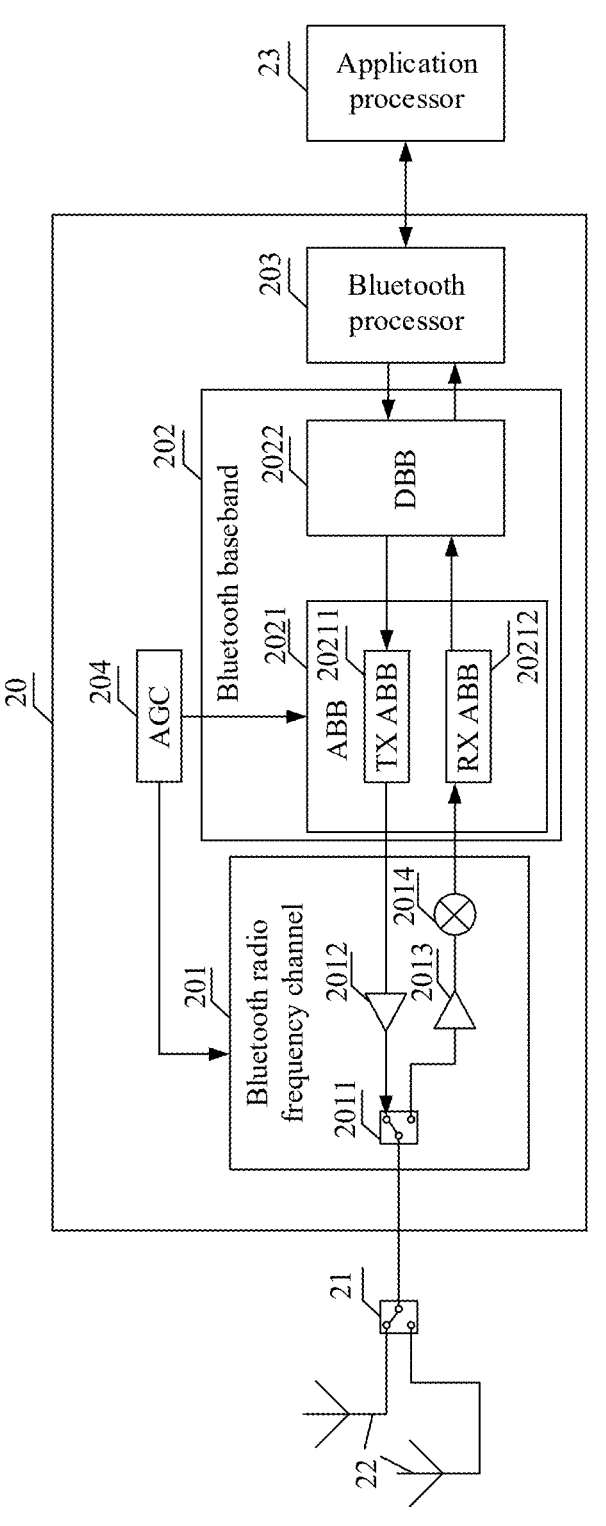
FIG. 2 is a schematic diagram 1 of a structure of a Bluetooth chip according to an embodiment of this application.

As shown in FIG. 2, a Bluetooth chip 20 includes a Bluetooth radio frequency channel 201 and a Bluetooth baseband 202, and, in an embodiment, further includes a Bluetooth processor 203 and an automatic gain control (AGC) 204. The Bluetooth chip 20 is coupled to antennas 22 through a single pole double throw (SPDT) switch 21, to implement switching of a single Bluetooth radio frequency channel between the two antennas 22. The Bluetooth chip 20 is further coupled to an application processor 23.

The Bluetooth radio frequency channel 201 includes an antenna switch 2011, a Bluetooth low noise amplifier (BT LNA) 2012, a Bluetooth power amplifier (BT PA) 2013, and a frequency mixer 2014. The antenna switch 2011 is configured to switch an antenna between a transmit channel and a receive channel. The BT LNA 2012 is configured to amplify a high-frequency analog signal with a low-frequency modulation signal received through the antenna. The BT PA 2013 is configured to amplify a transmitted high-frequency signal. The frequency mixer 2014 is configured to convert a radio frequency signal into an analog baseband signal.

The Bluetooth baseband 202 includes an analog baseband (ABB) 2021 and a digital baseband (DBB) 2022.

The ABB 2021 includes a receive analog baseband (RX ABB) 20211 and a transmit analog baseband (TX ABB) 20212. The RX ABB 20211 is configured to perform filtering, amplification processing, and analog-to-digital conversion on a received analog signal to obtain a digital signal. The TX ABB 20212 is configured to perform filtering, amplification processing, and digital-to-analog conversion on a transmitted digital signal to obtain an analog signal.

The DBB 2022 is configured to implement functions such as modulation/demodulation and channel access of a physical layer and a media access control (MAC) layer of a protocol.

The Bluetooth processor 203 is configured to perform processing related to a Bluetooth protocol stack, control another component of the Bluetooth chip, and provide a digital interface for coupling to the application processor 23.

The AGC 204 is configured to adjust gains of the BT LNA 2012, BT PA 2013, TX ABB 20212, and RX ABB 20211, to ensure appropriate amplitudes of received and transmitted signals, that is, ensure that the signals are not oversaturated or have excessively low amplitudes.

The application processor 23 is also referred to as a host central processing unit (CPU), and may run an operating system and application software (for example, a main chip on which an Android system is loaded in an Android mobile phone), that is, the processor 180 in FIG. 1.

When the Bluetooth chip in the foregoing embodiments works, because there is only one Bluetooth radio frequency channel, only one of the two antennas can work at a time. As a result, simultaneous receiving of a plurality of antennas cannot be implemented, and the two antennas are used through time division multiplexing instead. In addition, the Bluetooth chip can exchange data of only one Bluetooth radio frequency channel with the application processor, and an antenna with a good signal can be selected only after the different antennas are polled.

Time division multiplexing means that the two antennas cannot be simultaneously used for receiving.

Because postures of an air interface and the Bluetooth communications apparatus are dynamic, receiving performance of the two antennas changes with time. As a result, a previously selected optimal antenna is not necessarily optimal in a receiving process, causing poor user experience.

If the foregoing impact is reduced by increasing a quantity of switching times per unit time, because there is a switching time of the SPDT in a physical switching process, the Bluetooth chip is not coupled to the two antennas within the switching time. Because air-interface data arrives at the antenna at a random time, packet loss occurs during the switching time, which affects user experience.

In addition, adding the SPDT to a printed circuit board (PCB) will increase material costs and reduce an available area of the PCB.

In another embodiment, two Bluetooth chips each corresponds to one antenna, and each Bluetooth chip transmits data of one Bluetooth radio frequency channel.

Figure 3:
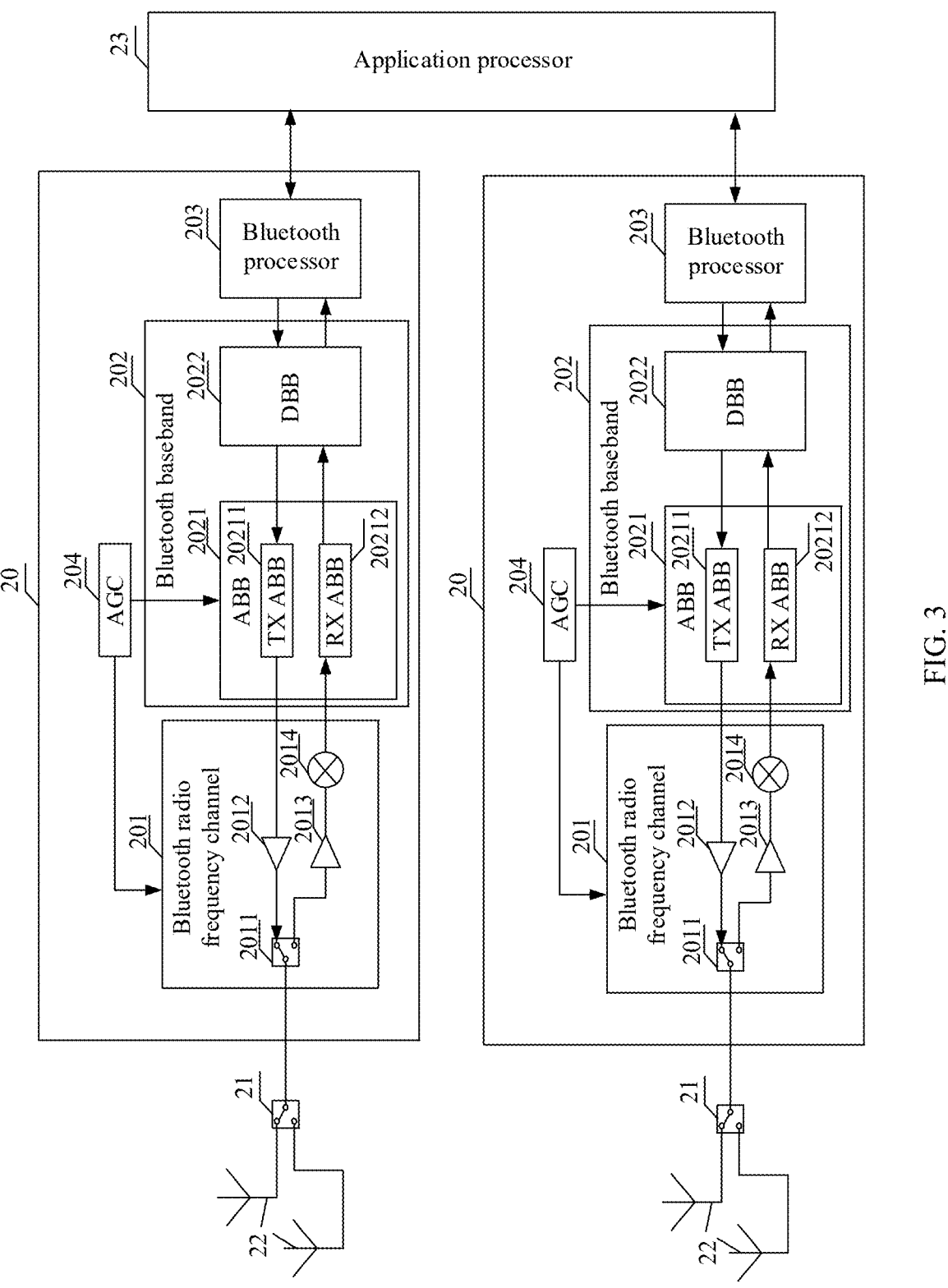
FIG. 3 is a schematic diagram 2 of a structure of a Bluetooth chip according to an embodiment of this application.

As shown in FIG. 3, a structure of each Bluetooth chip is the same as a structure of the Bluetooth chip in FIG. 2. Different Bluetooth chips 20 are coupled to an application processor 23 through independent digital channels.

The Bluetooth chip in the foregoing embodiment may support simultaneous receiving of two antennas. However, because the two Bluetooth chips separately process respective received signals, essentially, demodulation processing is performed on a signal received through a single Bluetooth radio frequency channel. Then the signals are sent to the application processor. The application processor selects and uses data of one of the Bluetooth radio frequency channels, but cannot combine data of the two Bluetooth radio frequency channels.

This embodiment can reduce only impact of antenna directivity in the following scenario 2, but cannot reduce impact of obstruction by an object on a signal strength of a Bluetooth signal in the following scenario 1. For example, when a plurality of antennas are obstructed, this embodiment produces a minimal effect.

In this embodiment, a plurality of independent Bluetooth chips are used, which increases a quantity of digital channels of the application processor. In addition, the application processor needs to control the plurality of Bluetooth chips at the same time. This also increases design complexity of the application processor.

In addition, adding more Bluetooth chips to the PCB increases material costs and reduces the available area of the PCB.

In still embodiment, two independent Bluetooth radio frequency channels are integrated into a single Bluetooth chip, and each Bluetooth radio frequency channel corresponds to one antenna.

Figure 4:
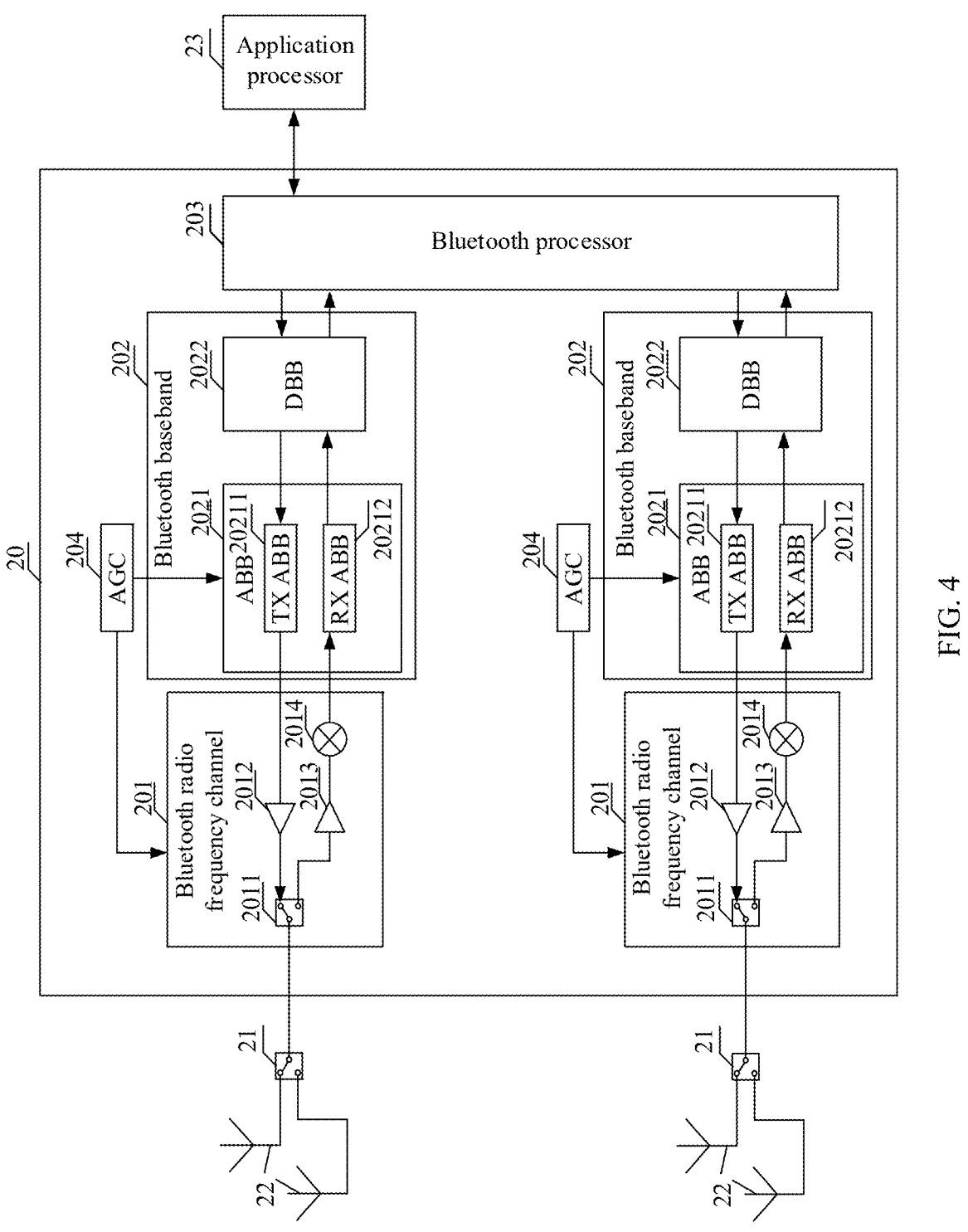
FIG. 4 is a schematic diagram 3 of a structure of a Bluetooth chip according to an embodiment of this application.

As shown in FIG. 4, the Bluetooth chip 20 includes two Bluetooth radio frequency channels 201 and two Bluetooth basebands 202, and, in an embodiment, includes a Bluetooth processor 203 and two AGCs 204. Each AGC 204 adjusts gains of one Bluetooth radio frequency channel 201 and one Bluetooth baseband 202. For structures and functions of the foregoing components, refer to the descriptions in FIG. 2.

For the Bluetooth chip in the foregoing embodiment, the two Bluetooth radio frequency channels are independent, and DBBs of the two Bluetooth basebands are also independent. Similar to the embodiment in FIG. 3, in this embodiment, respective received signals are processed separately, and then the Bluetooth processor selects and uses data of one of the Bluetooth radio frequency channels, but cannot combine the received signals.

For the Bluetooth chip in this embodiment, because the internal Bluetooth radio frequency channel and Bluetooth baseband are still independent, phases, signal strengths, and delays of signals received through different antennas are different due to impact of space. Therefore, essentially similar to the embodiment in FIG. 3, this embodiment cannot reduce impact of obstruction by an object on a signal strength of a Bluetooth signal in the following scenario 1.

The Bluetooth chip and the Bluetooth communications apparatus in this embodiment of this application may be applied to the following scenarios. A Bluetooth radio frequency channel with good signal quality is selected from a plurality of Bluetooth radio frequency channels, to reduce impact of antenna directivity, and impact of obstruction by an object on a signal strength of a Bluetooth signal is reduced by combining the plurality of Bluetooth radio frequency channels.

Exemplary scenario 1: A smartphone connecting to a Bluetooth headset is placed in a pocket, and an antenna of the smartphone is obstructed by clothes or a human body. As a result, a signal strength of a Bluetooth signal received by the Bluetooth headset decreases. The Bluetooth headset combines a plurality of Bluetooth radio frequency channels. Compared with a manner of processing a single Bluetooth receive channel in FIG. 2 to FIG. 4, sensitivity can be improved by up to 3 dB, thereby reducing impact of obstruction by an object on the signal strength of the Bluetooth signal. In this case, the Bluetooth communications apparatus is a Bluetooth headset.

Exemplary scenario 2: A Bluetooth speaker connecting to a smartphone has a fixed location, but relative locations or postures of the smartphone and the Bluetooth speaker change with movement of a user. Because the antenna is a non-omnidirectional antenna, there is a directivity problem. For example, when a radiation direction of the antenna on the smartphone held by the user does not point to the Bluetooth speaker, receiving a Bluetooth signal by the Bluetooth speaker is adversely affected. When receiving the Bluetooth signal through a plurality of Bluetooth radio frequency channels, the Bluetooth speaker can automatically select an antenna with good directivity. Through coverage complementation of a plurality of antennas, the impact of antenna directivity can be reduced.

Figure 5:
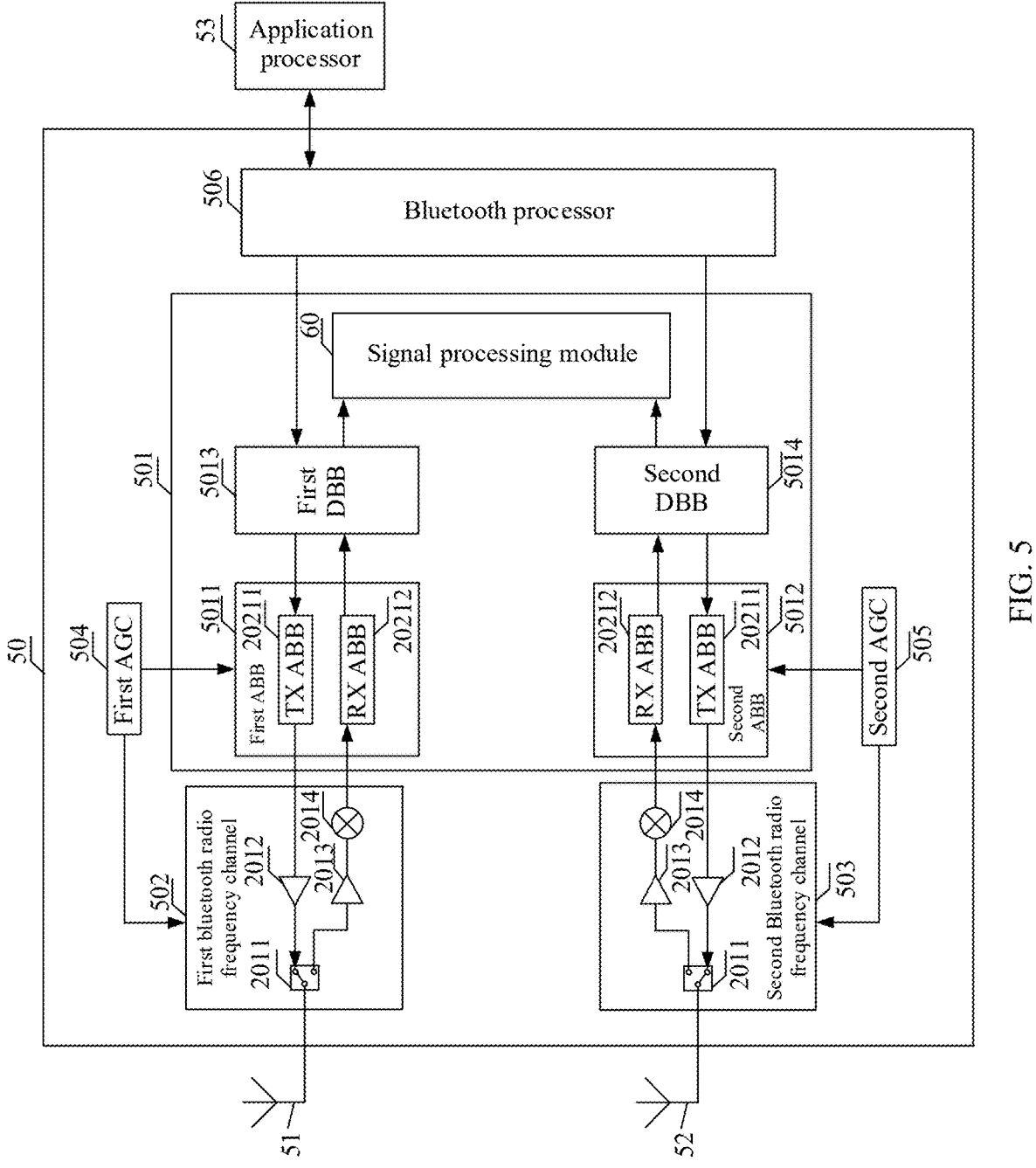
FIG. 5 is a schematic diagram 4 of a structure of a Bluetooth chip according to an embodiment of this application.
Figure 6:
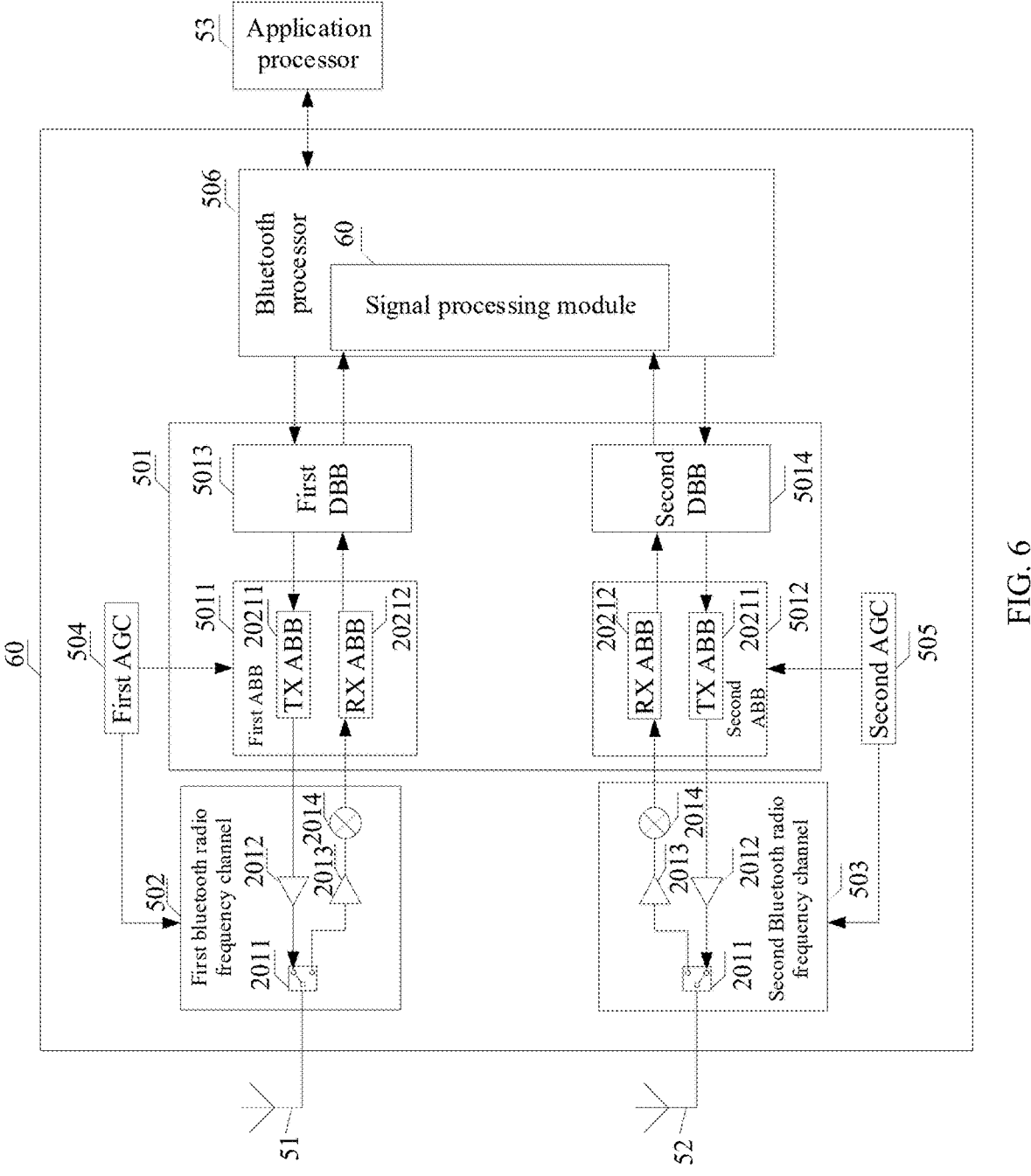
FIG. 6 is a schematic diagram 5 of a structure of a Bluetooth chip according to an embodiment of this application.

As shown in FIG. 5 and FIG. 6, an embodiment of this application provides a Bluetooth chip 50. The Bluetooth chip 50 is coupled to an application processor 53, and the Bluetooth chip 50 is also coupled to a first antenna 51 and a second antenna 52. The Bluetooth chip 50 receives, through at least one of the first antenna 51 and the second antenna 52, a signal transmitted by a transmitting device, demodulates the received signal (in an embodiment, combines a plurality of signals and then demodulates a combined signal), and sends a demodulated signal to the application processor 53.

The Bluetooth chip 50 includes: a Bluetooth baseband 501, a first Bluetooth radio frequency channel 502, and a second Bluetooth radio frequency channel 503, and, in an embodiment, further includes a first AGC 504, a second AGC 505, and a Bluetooth processor 506. The Bluetooth baseband 501 includes a first ABB 5011, a second ABB 5012, a first DBB 5013, and a second DBB 5014.

The first Bluetooth radio frequency channel 502 is coupled to the first antenna 51, and the second Bluetooth radio frequency channel 503 is coupled to the second antenna 52. The Bluetooth baseband 501 is coupled to each of the first Bluetooth radio frequency channel 502 and the second Bluetooth radio frequency channel 503. The first AGC 504 is coupled to the first Bluetooth radio frequency channel 502, and the second AGC 505 is coupled to the second Bluetooth radio frequency channel 503. The Bluetooth processor 506 is coupled to the Bluetooth baseband 501. For structures and functions of components in the Bluetooth channel and the Bluetooth baseband, and functions of the AGC, the application processor, and the Bluetooth processor, refer to the foregoing descriptions in FIG. 2. Details are not described herein again.

In an embodiment, the Bluetooth baseband 501 in FIG. 5 may further include a signal processing module 60, and the signal processing module 60 is coupled to each of the first DBB 5013 and the second DBB 5014. In another embodiment, the Bluetooth processor 506 in FIG. 6 may run a signal processing module 60.

Figure 7:
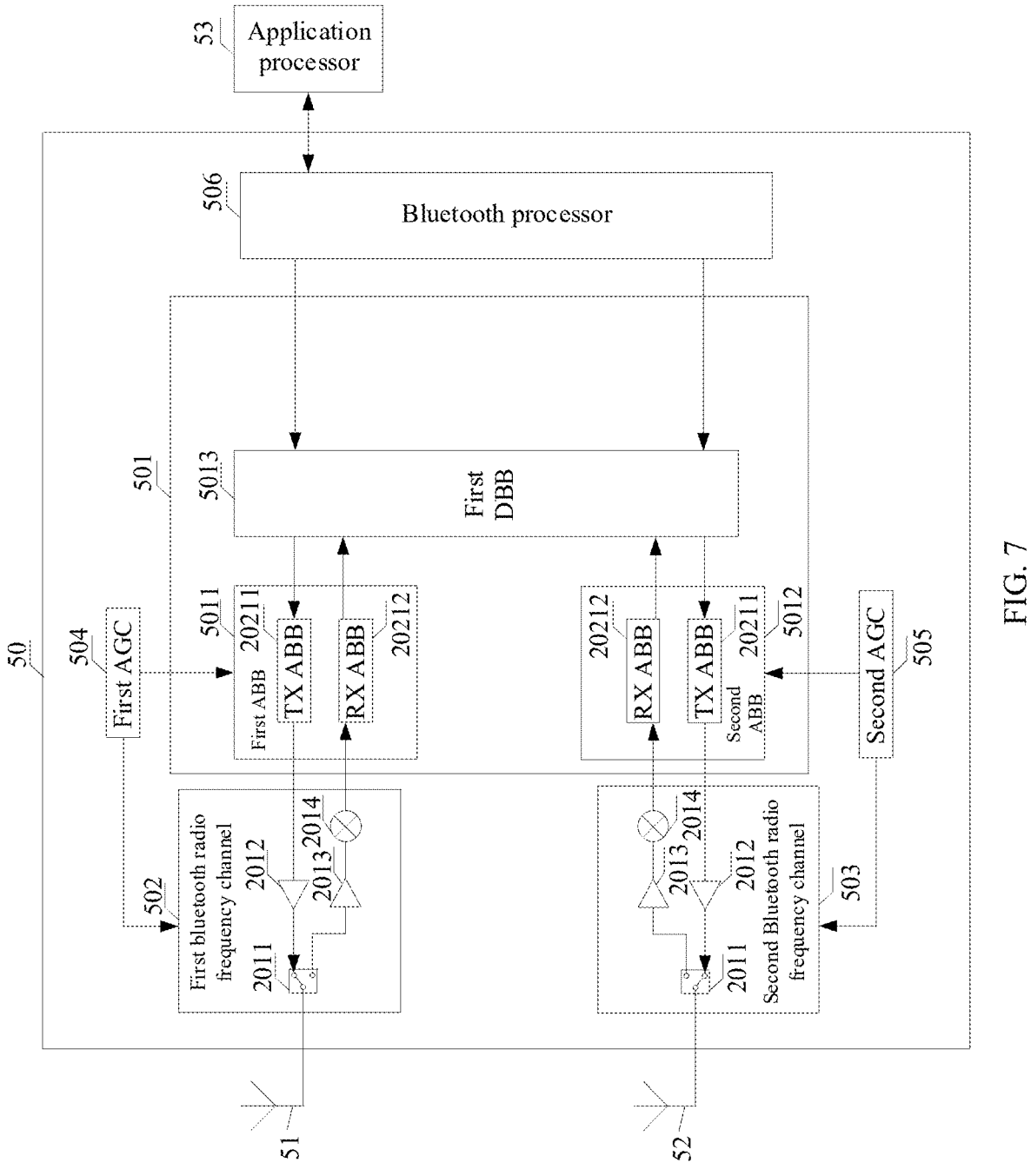
FIG. 7 is a schematic diagram 6 of a structure of a Bluetooth chip according to an embodiment of this application.

As shown in FIG. 7, this embodiment of this application provides another Bluetooth chip 50. A difference between the Bluetooth chip 50 and the Bluetooth chip 50 in FIG. 5 and FIG. 6 lies in that the first DBB 5013 is further coupled to the second ABB 5012, and FIG. 7 does not include a signal processing module or a second DBB.

The signal processing module 60 in FIG. 5 and FIG. 6 or the first DBB 5013 in FIG. 7 may execute a signal receiving method shown in FIG. 8. In other words, the method may be implemented by hardware circuits in FIG. 5 and FIG. 7 or by software in FIG. 6. For example, in this application, the hardware circuits in FIG. 5 and FIG. 7 are uniformly described as the Bluetooth baseband 501, which performs the signal receiving method shown in FIG. 8. However, this is not intended to be limited thereto.

As shown in FIG. 8, the signal receiving method includes the following operation:

S801: Selectively receive, through at least one of a first Bluetooth radio frequency channel or a second Bluetooth radio frequency channel, a signal transmitted by a transmitting device.

A Bluetooth baseband 501 receives, through the first Bluetooth radio frequency channel, the signal transmitted by the transmitting device, that is, receives the signal transmitted by the transmitting device, sequentially through a first antenna 51, an antenna switch 2011, an LNA 2013, and a frequency mixer 2014 of the first Bluetooth radio frequency channel 502, and an RX ABB in a first ABB 5011 and a first DBB 5013 in the Bluetooth baseband 501.

The Bluetooth baseband 501 receives, through the second Bluetooth radio frequency channel, the signal transmitted by the same transmitting device, that is, receives the signal transmitted by the same transmitting device, sequentially through a second antenna 52, an antenna switch 2011, an LNA 2013, and a frequency mixer 2014 in the second Bluetooth radio frequency channel 503, and an RX ABB in a second ABB 5012 and a second DBB 5014 (for FIG. 5 herein, and being a first DBB 5013 in FIG. 7) in the Bluetooth baseband 501.

Optionally, the Bluetooth baseband 501 may receive the signal transmitted by the transmitting device, through at least one of the first Bluetooth radio frequency channel or the second Bluetooth radio frequency channel, and based on signal quality of signals received through the first Bluetooth radio frequency channel and the second Bluetooth radio frequency channel.

The signal quality includes at least one of a signal-to-noise ratio (SNR), a signal strength, or noise intensity.

In an embodiment, the Bluetooth baseband 501 may select one of the first Bluetooth radio frequency channel or the second Bluetooth radio frequency channel based on the signal quality of the signals received through the first Bluetooth radio frequency channel and the second Bluetooth radio frequency channel, to receive the signal transmitted by the transmitting device. For example, a Bluetooth radio frequency channel with better signal quality is selected to receive the signal transmitted by the transmitting device.

In another embodiment, the Bluetooth baseband 501 may receive, through the first Bluetooth radio frequency channel and the second Bluetooth radio frequency channel, the signal transmitted by the transmitting device; and combine signals received through the first Bluetooth radio frequency channel and the second Bluetooth radio frequency channel based on the signal quality of the signals received through the first Bluetooth radio frequency channel and the second Bluetooth radio frequency channel. In other words, the Bluetooth baseband 501 receives, through the two Bluetooth radio frequency channels, the signal transmitted by the transmitting device, and then combines the signals received through the two Bluetooth radio frequency channels, based on the signal quality of the two Bluetooth radio frequency channels.

When a plurality of Bluetooth radio frequency channels receives a signal from a same transmitting device, signals received through different Bluetooth radio frequency channels are affected by transmission paths, channel attenuation, and corresponding antenna locations of different Bluetooth radio frequency channels, and vary in terms of signal-to-noise ratio, signal strength, noise intensity, phase, time delay, and the like. Therefore, the Bluetooth baseband 501 may first obtain a time delay and a phase difference between the first Bluetooth radio frequency channel and the second Bluetooth radio frequency channel, perform, based on the time delay, time alignment on the signals received through the first Bluetooth radio frequency channel and the second Bluetooth radio frequency channel; and perform, based on the phase difference, phase alignment on the signals received through the first Bluetooth radio frequency channel and the second Bluetooth radio frequency channel, so that signals received through different Bluetooth radio frequency channels are in-phase superposed at the same time, to obtain a maximum gain.

Specifically, it is assumed that the Bluetooth baseband 501 uses a signal received through the first Bluetooth radio frequency channel as a reference signal, a time delay of the second Bluetooth radio frequency channel relative to the reference signal is $\Delta T_i$, a phase difference is $\Delta \alpha_i$, and a signal received through the second Bluetooth radio frequency channel is $X_i(t)$. In this case, the Bluetooth baseband 501 may perform the following processing $X_i(t-\Delta T_i)e^{(-j*\Delta \alpha i)}$ on the signal received through the second Bluetooth radio frequency channel $X_i(t)$ based on the time delay $\Delta T_i$ and the phase difference $\Delta \alpha_i$ between the second Bluetooth radio frequency channel and the reference signal. In this way, time alignment and phase alignment can be performed on the signals received through the two Bluetooth radio frequency channels.

After the time alignment and the phase alignment are performed, the Bluetooth baseband 501 determines a weight of the first Bluetooth radio frequency channel and a weight of the second Bluetooth radio frequency channel based on the signal quality of the signals received through the first Bluetooth radio frequency channel and the second Bluetooth radio frequency channel. A weight of a Bluetooth radio frequency channel with better signal quality is larger than a weight of a Bluetooth radio frequency channel with poorer signal quality, that is, a Bluetooth radio frequency channel with better signal quality has a larger weight. A larger signal strength indicates better signal quality and a larger corresponding weight. A larger signal-to-noise ratio indicates better signal quality and a larger corresponding weight. Lower noise intensity indicates better signal quality and a larger corresponding weight.

It should be noted that a weight may also be adjusted by combining various signal quality, for example, $w_i=k_1*SNR+k_2*SI+k_3*Noise$, where $w_i$ represents a weight of an $i^{th}$ Bluetooth radio frequency channel, SNR represents a signal-to-noise ratio, SI represents a signal strength, Noise represents noise intensity, and $k_1$, $k_2$, and $k_3$ are coefficients.

For a Bluetooth radio frequency channel with poor signal quality, a weight thereof may be adjusted to zero, that is, the Bluetooth radio frequency channel does not participate in combination. If a weight of only one Bluetooth radio frequency channel in the plurality of Bluetooth radio frequency channels is non-zero, and weights of the other Bluetooth radio frequency channels are zero, this is equivalent to processing of a single Bluetooth radio frequency channel in FIG. 2, FIG. 3, or FIG. 4.

Specifically, the Bluetooth baseband 501 combines, according to formula 1, the signals received through the first Bluetooth radio frequency channel and the second Bluetooth radio frequency channel, where a combined signal is represented in a form of SNR in the formula:

$$SNR = \frac{\left(\sum_{i=1}^{N}\left(w_i * \sqrt{S_i}\right)\right)^2}{\sum_{i=1}^{N} w_i^2 * N_0} \qquad \text{Formula 1}$$

$w_i$ represents the weight of the $i^{th}$ Bluetooth radio frequency channel, $S_i$ represents a signal strength of a signal received through the $i^{th}$ Bluetooth radio frequency channel, $N_0$ represents noise intensity (in this case, it is considered that noise intensity of Bluetooth radio frequency channels is the same), and N represents a quantity (for example, 2) of Bluetooth radio frequency channels. In this formula, the combined signal is represented in the form of SNR, which meets an input requirement of demodulation processing. A Bluetooth radio frequency channel with better signal quality has a larger weight w, a greater amplification effect on the signal strength S, and a larger combination gain.

After combining a plurality of signals, the Bluetooth baseband 501 may demodulate a combination result, and send a demodulation result to the application processor for further processing.

The following describes this operation by using an example in which there are two Bluetooth radio frequency channels and the signal quality is SNR. If SNRs of the two Bluetooth radio frequency channels are the same, weights of the two Bluetooth radio frequency channels are the same, and two signals received through the two Bluetooth radio frequency channels are combined based on the same weights. If SNRs of the two Bluetooth radio frequency channels are different, and an SNR of a first Bluetooth radio frequency channel is larger than an SNR of a second Bluetooth radio frequency channel, a weight of the first Bluetooth radio frequency channel is greater than a weight of the second Bluetooth radio frequency channel, and two signals received through the two Bluetooth radio frequency channels are combined based on different weights. In view of the impact of obstruction by an object on a signal strength of a Bluetooth signal described in scenario 1, combination of the two signals can theoretically improve sensitivity by 3 dB, and combination of a plurality of signals can improve sensitivity by a larger degree.

As shown in FIG. 9, when a relative location between a Bluetooth communications apparatus 91 and a transmitting device 92 changes, because a relative location of an antenna of the Bluetooth communications apparatus 91 or a Bluetooth channel changes, a signal received through a Bluetooth radio frequency channel changes. If an SNR of a Bluetooth radio frequency channel deteriorates, a weight of the Bluetooth radio frequency channel may be reduced based on an SNR deterioration degree. In addition, the weight of the Bluetooth radio frequency channel may be adjusted to zero. This means that the Bluetooth radio frequency channel does not participate in signal combination. This is equivalent to that a best Bluetooth radio frequency channel in a plurality of Bluetooth radio frequency channels is used for receiving, to avoid a negative combination gain. In view of the antenna directivity described in the foregoing scenario 2, a weight of a Bluetooth radio frequency channel corresponding to an antenna with good directivity may be increased, and a weight of a Bluetooth radio frequency channel corresponding to an antenna with poor directivity may be reduced, thereby implementing coverage complementation of a plurality of antennas and reducing impact of antenna directivity.

In conclusion, the Bluetooth chip, the signal receiving method, and the Bluetooth communications apparatus are provided in embodiments of this application. The Bluetooth chip includes: a first Bluetooth radio frequency channel coupled to a first antenna: a second Bluetooth radio frequency channel coupled to a second antenna; and a Bluetooth baseband coupled to each of the first Bluetooth radio frequency channel and the second Bluetooth radio frequency channel, and configured to selectively receive, through at least one of the first Bluetooth radio frequency channel or the second Bluetooth radio frequency channel, a signal transmitted by a transmitting device. On one hand, when one Bluetooth radio frequency channel is selected to receive a signal, a Bluetooth radio frequency channel corresponding to an antenna with good directivity may be selected. On the other hand, when two Bluetooth radio frequency channels are selected to receive signals, these signals may be combined, so that sensitivity can be improved, thereby improving a signal strength of a received signal obstructed by an object.

An embodiment of this application further provides a computer-readable storage medium. The computer-readable storage medium stores a computer program. When the computer program is run on a computer or a processor, the computer or the processor is enabled to perform the method corresponding to FIG. 8.

An embodiment of this application further provides a computer program product including instructions. When the instructions are run on a computer or a processor, the computer or the processor is enabled to perform the method corresponding to FIG. 8.

It should be understood that, in embodiments of this application, sequence numbers of the foregoing processes do not mean execution sequences. The execution sequences of the processes should be determined based on functions and internal logic of the processes, and shall not constitute any limitation on embodiments of this application.

A person of ordinary skill in the art may be aware that units and algorithm operations in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, device, and method may be implemented in other manners. For example, the described device embodiment is merely an example. For example, division into the units is merely logical function division and there may be another division manner in actual implementation. For example, a plurality of units or components may be combined or integrated into another system, or some features may be ignored or not performed. In addition, displayed or discussed mutual couplings or direct couplings or communication connections may be implemented through some interfaces. The indirect couplings or communication connections between devices or units may be implemented in electronic, mechanical, or other forms.

The unit described as a separate part may or may not be physically separate, and a part displayed as a unit may or may not be a physical unit, that is, may be located in one position, or may be distributed on a plurality of network elements. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

All or some of the foregoing embodiments may be implemented by software, hardware, firmware, or any combination thereof. When a software program is used for implementation, embodiments may be implemented completely or partially in a form of a computer program product. The computer program product includes one or more computer instructions. When computer program instructions are loaded and executed on a computer, the procedures or functions according to embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center that are integrated by one or more available media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A Bluetooth chip, comprising:
a first Bluetooth radio frequency channel coupled to a first antenna;
a second Bluetooth radio frequency channel coupled to a second antenna; and
a Bluetooth baseband coupled to each of the first Bluetooth radio frequency channel and the second Bluetooth radio frequency channel, and configured to:
receive a signal transmitted by a transmitting device through the first Bluetooth radio frequency channel and a signal transmitted by the transmitting device through the second Bluetooth radio frequency channel, and
combine the signals received through the first Bluetooth radio frequency channel and the second Bluetooth radio frequency channel based on signal quality of the signals received through the first Bluetooth radio frequency channel and the second Bluetooth radio frequency channel;
wherein the Bluetooth baseband is configured to combine the signals received through the first Bluetooth radio frequency channel and the second Bluetooth radio frequency channel comprises the Bluetooth baseband is configured to:
determine a weight of the first Bluetooth radio frequency channel and a weight of the second Bluetooth radio frequency channel based on the signal quality, wherein a Bluetooth radio frequency channel with better signal quality has a larger weight, and
combine the signals received through the first Bluetooth radio frequency channel and the second Bluetooth radio frequency channel based on the weight of the first Bluetooth radio frequency channel and the weight of the second Bluetooth radio frequency channel.

2. The Bluetooth chip according to claim 1, wherein the Bluetooth baseband is further configured to:
obtain a time delay and a phase difference between the first Bluetooth radio frequency channel and the second Bluetooth radio frequency channel;

perform, based on the time delay, time alignment on the signals received through the first Bluetooth radio frequency channel and the second Bluetooth radio frequency channel; and perform, based on the phase difference, phase alignment on the signals received through the first Bluetooth radio frequency channel and the second Bluetooth radio frequency channel.

3. The Bluetooth chip according to claim 1, wherein the Bluetooth baseband is configured to combine the signals received through the first Bluetooth radio frequency channel and the second Bluetooth radio frequency channel based on the weight of the first Bluetooth radio frequency channel and the weight of the second Bluetooth radio frequency channel comprises the Bluetooth baseband is configured to:

combine, according to the formula $$SNR = \frac{\left(\sum_{i=1}^{N} \left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, wherein $w_i$ represents a weight of an $i^{th}$ Bluetooth radio frequency channel, $S_i$ represents signal energy received through the $i^{th}$ Bluetooth radio frequency channel, $N_0$ represents noise intensity, and N represents a quantity of Bluetooth radio frequency channels.

4. A signal receiving method for a Bluetooth chip, the method comprising:

receiving a signal transmitted by a transmitting device through a first Bluetooth radio frequency channel of the Bluetooth chip;

receiving a signal transmitted by the transmitting device through a second Bluetooth radio frequency channel of the Bluetooth chip; and combining the signals received through the first Bluetooth radio frequency channel and the second Bluetooth radio frequency channel based on signal quality of the signals received through the first Bluetooth radio frequency channel and the second Bluetooth radio frequency channel;

wherein combining the signals received through the first Bluetooth radio frequency channel and the second Bluetooth radio frequency channel comprises:

determining a weight of the first Bluetooth radio frequency channel and a weight of the second Bluetooth radio frequency channel based on the signal quality, wherein a Bluetooth radio frequency channel with better signal quality has a larger weight, and combining the signals received through the first Bluetooth radio frequency channel and the second Bluetooth radio frequency channel based on the weight of the first Bluetooth radio frequency channel and the weight of the second Bluetooth radio frequency channel.

5. The signal receiving method according to claim 4, further comprising:

obtaining a time delay and a phase difference between the first Bluetooth radio frequency channel and the second Bluetooth radio frequency channel;

performing, based on the time delay, time alignment on the signals received through the first Bluetooth radio frequency channel and the second Bluetooth radio frequency channel; and performing, based on the phase difference, phase alignment on the signals received through the first Bluetooth radio frequency channel and the second Bluetooth radio frequency channel.

6. The signal receiving method according to claim 4, wherein combining the signals received through the first Bluetooth radio frequency channel and the second Bluetooth radio frequency channel based on the weight of the first Bluetooth radio frequency channel and the weight of the second Bluetooth radio frequency channel comprises:

combining, according to the formula $$SNR = \frac{\left(\sum_{i=1}^{N} \left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, wherein $w_i$ represents a weight of an $i^{th}$ Bluetooth radio frequency channel, $S_i$ represents signal energy received through the $i^{th}$ Bluetooth radio frequency channel, $N_0$ represents noise intensity, and N represents a quantity of Bluetooth radio frequency channels.

7. A Bluetooth communications apparatus, comprising:

a first antenna;

a second antenna;

an application processor; and a Bluetooth chip coupled to the application processor, and comprising:

a first Bluetooth radio frequency channel coupled to the first antenna;

a second Bluetooth radio frequency channel coupled to the second antenna; and a Bluetooth baseband coupled to each of the first Bluetooth radio frequency channel and the second Bluetooth radio frequency channel, and configured to:

receive a signal transmitted by a transmitting device through the first Bluetooth radio frequency channel and a signal transmitted by the transmitting device through the second Bluetooth radio frequency channel, and combine the signals received through the first Bluetooth radio frequency channel and the second Bluetooth radio frequency channel based on signal quality of the signals received through the first Bluetooth radio frequency channel and the second Bluetooth radio frequency channel;

wherein the Bluetooth chip is configured to demodulate the received signals and send demodulated signals to the application processor;

wherein the Bluetooth baseband is configured to combine the signals received through the first Bluetooth radio frequency channel and the second Bluetooth radio frequency channel comprises the Bluetooth baseband is configured to:

determine a weight of the first Bluetooth radio frequency channel and a weight of the second Bluetooth radio frequency channel based on the signal quality, wherein a Bluetooth radio frequency channel with better signal quality has a larger weight, and combine the signals received through the first Bluetooth radio frequency channel and the second Bluetooth radio frequency channel based on the weight of the first Bluetooth radio frequency channel and the weight of the second Bluetooth radio frequency channel.

8. The Bluetooth communications apparatus according to claim 7, wherein the Bluetooth baseband is further configured to:

obtain a time delay and a phase difference between the first Bluetooth radio frequency channel and the second Bluetooth radio frequency channel;

perform, based on the time delay, time alignment on the signals received through the first Bluetooth radio frequency channel and the second Bluetooth radio frequency channel; and perform, based on the phase difference, phase alignment on the signals received through the first Bluetooth radio frequency channel and the second Bluetooth radio frequency channel.

9. The Bluetooth communications apparatus according to claim 7, wherein the Bluetooth baseband is configured to combine the signals received through the first Bluetooth radio frequency channel and the second Bluetooth radio frequency channel based on the weight of the first Bluetooth radio frequency channel and the weight of the second Bluetooth radio frequency channel comprises the Bluetooth baseband is configured to:

combine, according to the formula $$SNR = \frac{\left(\sum_{i=1}^{N}\left(w_i * \sqrt{S_i}\right)\right)^2}{\sum_{i=1}^{N} w_i^2 * N_0},$$

the signals received through the first Bluetooth radio frequency channel and the second Bluetooth radio frequency channel, wherein $w_i$ represents a weight of an $i^{th}$ Bluetooth radio frequency channel, $S_i$ represents signal energy received through the $i^{th}$ Bluetooth radio frequency channel, $N_0$ represents noise intensity, and N represents a quantity of Bluetooth radio frequency channels.

\* \* \* \* \*